(12) United States Patent
Kordel et al.

(10) Patent No.: US 7,745,745 B2
(45) Date of Patent: Jun. 29, 2010

(54) HOUSING FOR A PYROMECHANICAL DISCONNECTING DEVICE WITH INTEGRATED IGNITION ELEMENT

(75) Inventors: Gerhard Kordel, Nuremberg (DE); Jurgen Knauss, Obermichelbach (DE)

(73) Assignee: Delphi Technologies, Inc., Troy, MI (US)

( * ) Notice: Subject to any disclaimer, the term of this patent is extended or adjusted under 35 U.S.C. 154(b) by 1138 days.

(21) Appl. No.: 10/835,065

(22) Filed: Apr. 30, 2004

(65) Prior Publication Data

US 2005/0034595 A1    Feb. 17, 2005

(30) Foreign Application Priority Data

Apr. 30, 2003  (DE) ............................... 103 19 749
Mar. 5, 2004   (DE) ....................... 10 2004 010 746

(51) Int. Cl.
    *H01H 85/00*    (2006.01)
(52) U.S. Cl. .................................... 200/61.08; 337/157
(58) Field of Classification Search ............. 200/61.08, 200/151, 306; 337/157–159, 401–409; 89/1.14; 83/639.4
    See application file for complete search history.

(56) References Cited

U.S. PATENT DOCUMENTS

| | | | | |
|---|---|---|---|---|
| 3,794,794 | A * | 2/1974 | Provancher | 200/61.53 |
| 4,224,487 | A * | 9/1980 | Simonsen | 200/61.08 |
| 4,417,519 | A * | 11/1983 | Lutz | 200/61.08 |
| 5,535,842 | A * | 7/1996 | Richter et al. | 200/61.08 |
| 5,877,563 | A * | 3/1999 | Krappel et al. | 200/61.08 |
| 6,194,988 | B1 * | 2/2001 | Yamaguchi et al. | 200/61.08 |
| 6,419,263 | B1 * | 7/2002 | Busgen et al. | 280/733 |
| 6,496,098 | B1 * | 12/2002 | Kern et al. | 337/401 |

FOREIGN PATENT DOCUMENTS

| | | |
|---|---|---|
| DE | 43 07 774 | 9/1994 |
| DE | 196 16 993 | 10/1997 |

\* cited by examiner

*Primary Examiner*—Renee S Luebke
*Assistant Examiner*—Marina Fishman
(74) *Attorney, Agent, or Firm*—Thomas N. Twomey

(57) ABSTRACT

A pyromechanical disconnecting device, in particular for battery shutoff in a motor vehicle include a housing (1) in which there is arranged a conductor bus (11) that is designed to be severable by a cutting chisel (12) at a predetermined cut point, the cutting chisel being capable of being accelerated by the propellant gases of an ignition element (2). In order to facilitate assembly it is proposed that the housing (1) be extruded around the ignition element (2), which in this way forms one structural unit with the housing (1).

9 Claims, 2 Drawing Sheets

HOUSING FOR A PYROMECHANICAL DISCONNECTING DEVICE WITH INTEGRATED IGNITION ELEMENT

BACKGROUND OF THE INVENTION

The invention relates to a pyromechanical disconnecting device, in particular for battery shutoff in a motor vehicle, having a housing in which there is arranged a conductor bus that is designed to be severable by a cutting chisel at a predetermined cut position, the cutting chisel being capable of being accelerated by the propellant gases of an ignition element.

The technical embodiment of a pyromechanical disconnecting device is known in which the electrical ignition element is located in the housing as an external assembly that is inserted in a complicated and cost-intensive assembly process.

BRIEF SUMMARY OF THE INVENTION

According to the invention this disadvantage is remedied in that the housing is extruded around the ignition element, which in this way forms one structural unit with the housing. In this way the entire procedure of inserting the ignition element into the housing becomes unnecessary.

Thus the extrusion around the ignition element simultaneously has the function of a housing for a pyromechanical disconnecting device.

In a preferred embodiment the housing is made of an electrically insulating material, in particular a plastic.

Strength-enhancing fillers such as glass fibers or carbon fibers are advantageously arranged in the insulating material.

According to the invention the housing is not extruded around the connecting pins of the ignition element for electrical contacting or said pins are arranged in a recess of the housing.

In one embodiment the connecting pins of the ignition element are insulated from one another. This may be necessary because of the material properties of the housing.

In the region of the ignition element the interior of the housing preferably has a peripheral recess for attaching the cutting chisel.

In a particular embodiment a peripheral groove is arranged in the peripheral recess on the side facing toward the ignition element, in which groove a seal ring is accommodated. This seal ring can be for example an O-ring.

BRIEF DESCRIPTION OF THE SEVERAL VIEWS OF THE DRAWINGS

In what follows, the invention is described in more detail with reference to two drawings in which.

DETAILED DESCRIPTION OF THE INVENTION

Figure 1:
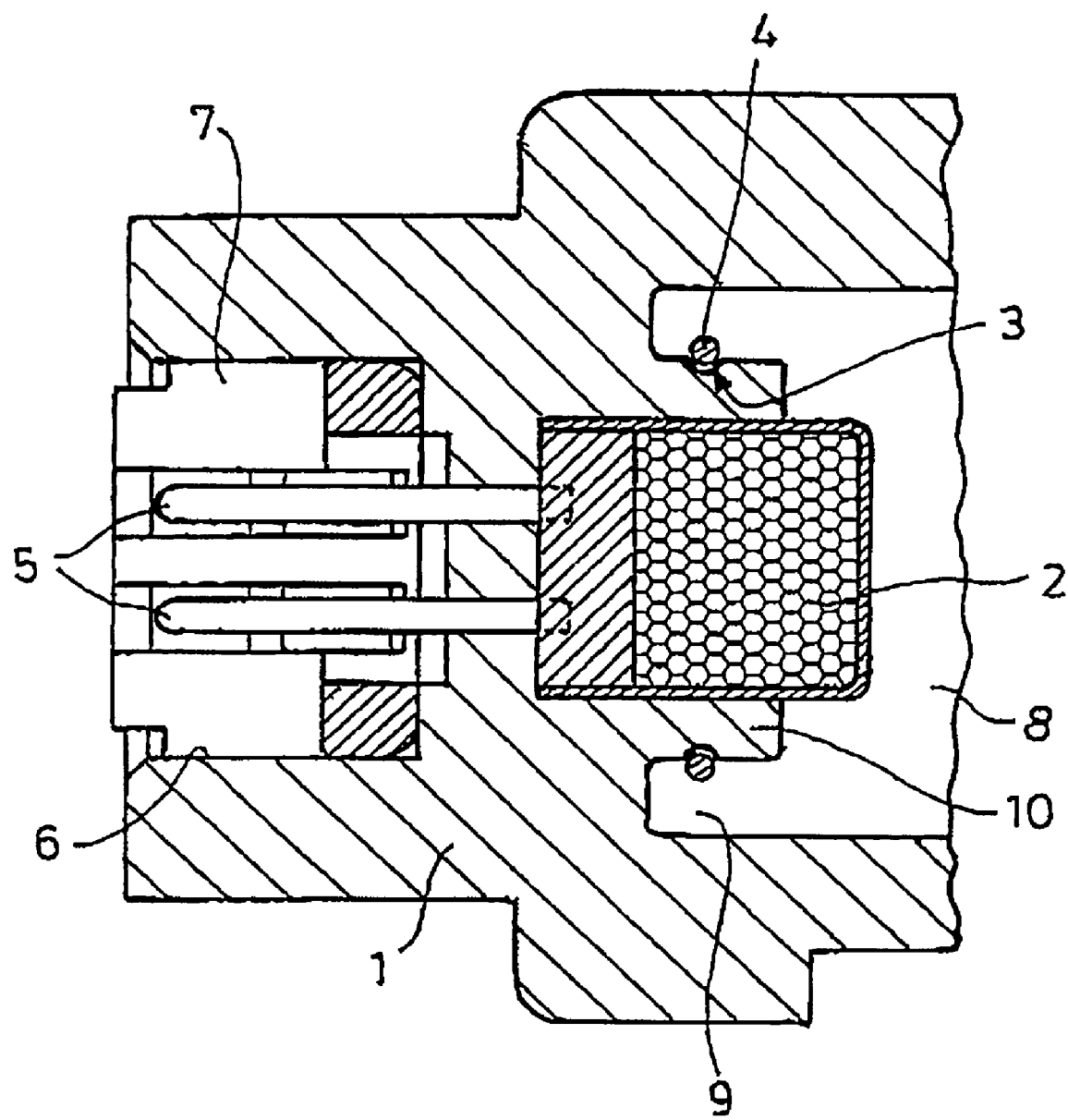
FIG. 1 shows a portion of an embodiment of pyromechanical disconnecting device of the present invention.

FIG. 1 shows a portion of a pyromechanical disconnecting device for battery shutoff in a motor vehicle, having an ignition element 2, housing 1 being extruded around said ignition element, which in this way forms one structural unit with housing 1. Housing 1 is made of an electrically insulating material such as plastic in which strength-enhancing fillers, in particular glass fibers or carbon fibers, are contained.

Housing 1 is not extruded around connecting pins 5 for electrical contacting but said pins are arranged in a recess 6 of housing 1 and are in this case fashioned as a plug connector 7 or respectively connected to a plug connector 7.

Figure 2:
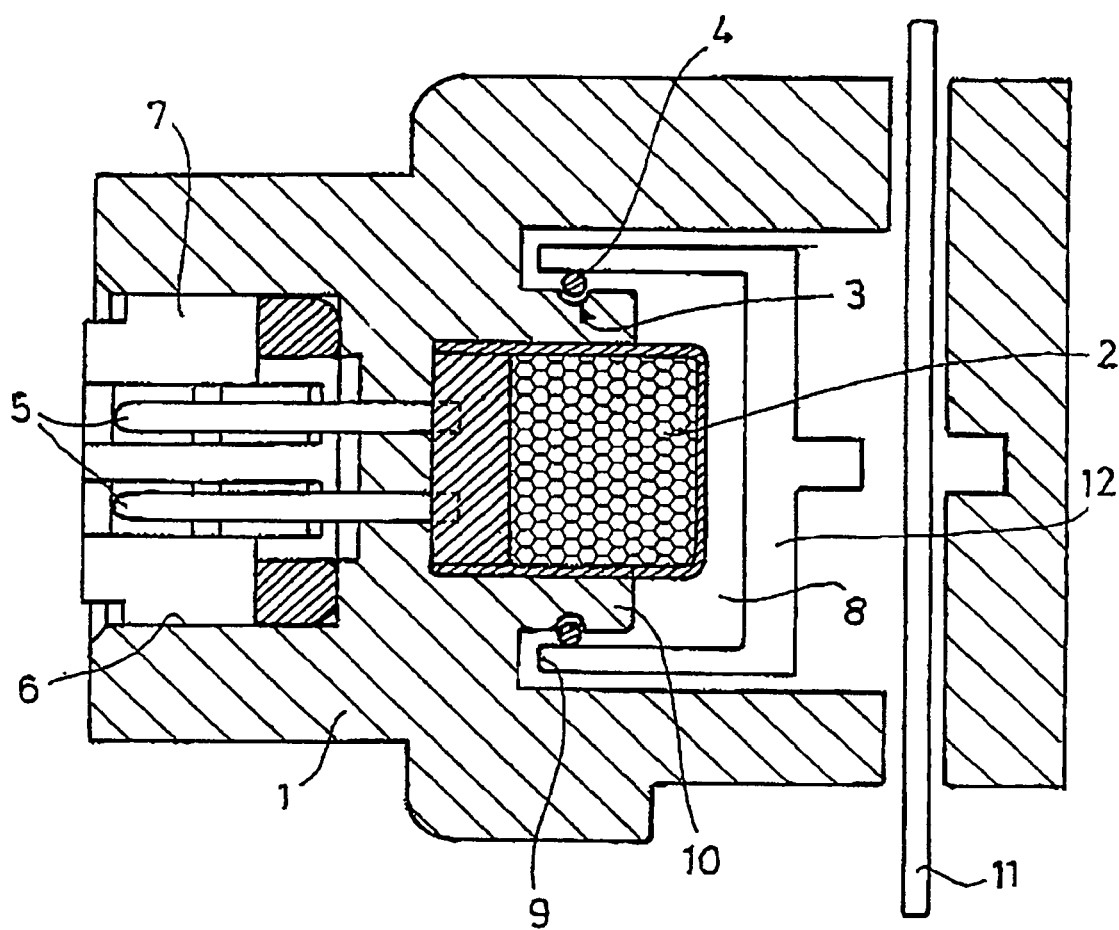
FIG. 2 shows an embodiment of pyromechanical disconnecting device of the present invention used for e.g., a battery shut off in a motor vehicle.

In the interior of housing 1 (see FIG. 2) there is a receiving space 8 for receiving a cutting chisel 12 and a conductor bus 11, conductor bus 11 being designed to be severable by cutting chisel 12 at a predetermined cut position. Cutting chisel 12 is accelerated toward the predetermined cut position by propellant gases arising upon the firing of ignition element 2.

So that cutting chisel 12 can be encompassingly attached to ignition element 2, a peripheral recess 9 is arranged in receiving space 8 in housing 1 in the region of ignition element 2, an annular projection 10 of housing 1 being arranged between ignition element 2 and recess 9. Arranged in peripheral recess 9 on the side facing toward ignition element 2 is a peripheral groove 3 in which a seal ring 4 is accommodated. This peripheral groove 3 is accordingly arranged in annular projection 10 toward recess 9. Cutting chisel 12 is attached in this recess 9 and thus encompasses ignition element 2.

The invention claimed is:

1. A pyromechanical disconnecting device comprising a housing in which there is arranged a conductor bus that is designed to be severable by a cutting chisel at a predetermined cut point, the cutting chisel being capable of being accelerated by the propellant gases of an ignition element, characterized in that the housing is extruded around the ignition element, which in this way forms one structural unit with the housing.

2. The pyromechanical disconnecting device according to claim 1, characterized in that the housing is made of an electrically insulating material.

3. The pyromechanical disconnecting device according to claim 2, characterized in that strength-enhancing fillers such as glass fibers or carbon fibers are arranged in the insulating material.

4. The pyromechanical disconnecting device according to claim 1, characterized in that the housing is made of a plastic.

5. The pyromechanical disconnecting device according to claim 1, characterized in that the housing is not extruded around connecting pins of the ignition element for electrical contacting and said pins are arranged in a recess of the housing.

6. The pyromechanical disconnecting device according to claim 5, characterized in that the connecting pins of the ignition element are insulated from one another.

7. The pyromechanical disconnecting device according to claim 1, characterized in that an interior of the housing has a peripheral recess in the region of the ignition element for attaching the cutting chisel.

8. The pyromechanical disconnecting device according to claim 7, characterized in that there is arranged in the peripheral recess, one the side facing toward the ignition element, a peripheral groove in which a seal ring is accommodated.

9. A battery shut off in a motor vehicle comprising a housing in which there is arranged a conductor bus that is designed to be severable by a cutting chisel at a predetermined cut point, the cutting chisel being capable of being accelerated by the propellant gases of an ignition element, characterized in that the housing is extruded around the ignition element, which in this way forms one structural unit with the housing.

* * * * *